W. T. AND W. W. KING.
EMERGENCY AUTOMOBILE TIRE.
APPLICATION FILED MAR. 20, 1922.
1,432,398.
Patented Oct. 17, 1922.
2 SHEETS—SHEET 1.
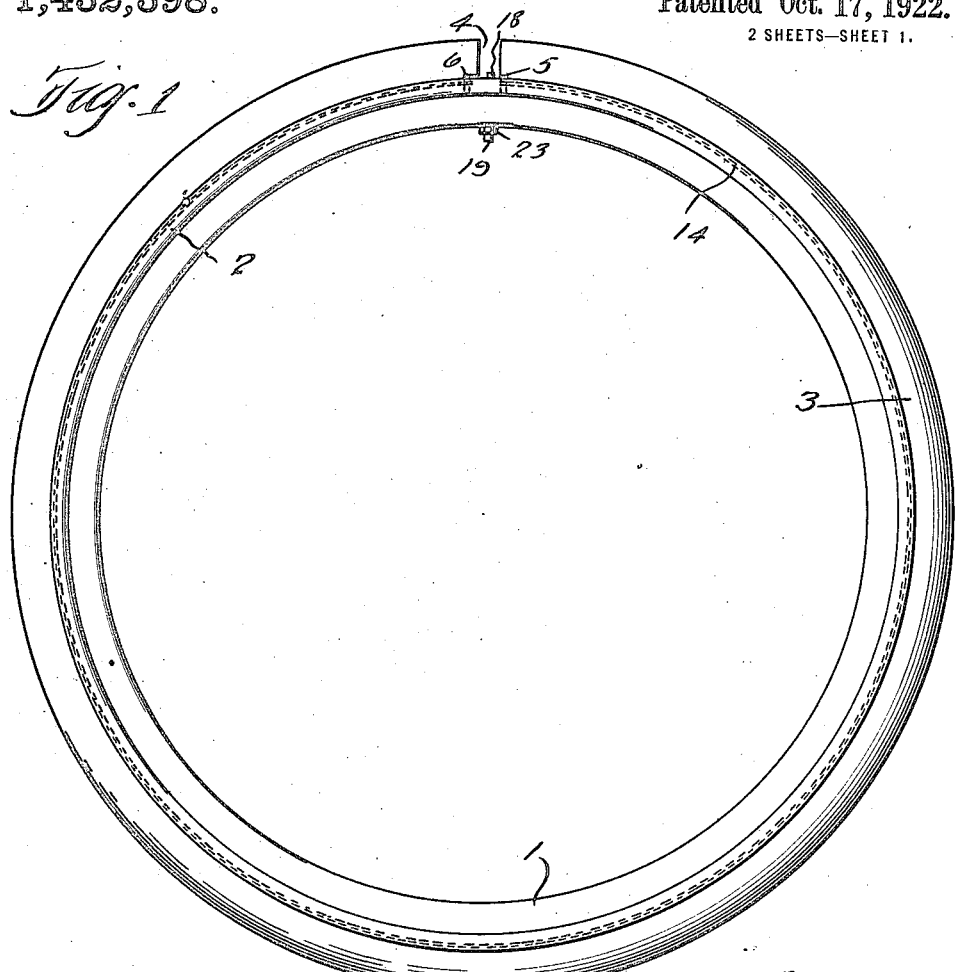
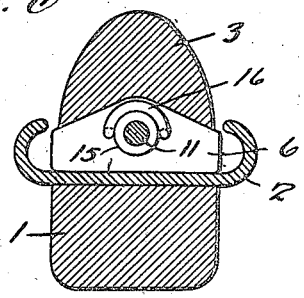
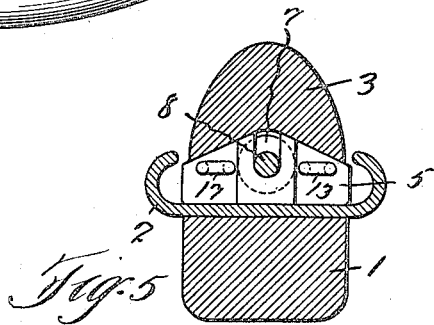
Inventors
William T. King
Wayne W. King
By John A. Bornhardt
Atty.

W. T. AND W. W. KING.
EMERGENCY AUTOMOBILE TIRE.
APPLICATION FILED MAR. 20, 1922.

1,432,398.

Patented Oct. 17, 1922.
2 SHEETS—SHEET 2.

Inventors
William T. King
By Wayne W. King
John A. Bornhardt
Atty.

Patented Oct. 17, 1922.

1,432,398

UNITED STATES PATENT OFFICE.

WILLIAM T. KING AND WAYNE W. KING, OF ALLIANCE, OHIO.

EMERGENCY AUTOMOBILE TIRE.

Application filed March 20, 1922. Serial No. 545,142.

*To all whom it may concern:*

Be it known that we, WILLIAM T. KING and WAYNE W. KING, citizens of the United States, residing at Alliance, in the county of Stark and State of Ohio, have invented certain new and useful Improvements in Emergency Automobile Tires, of which the following is a specification.

This invention relates to automobile tires and has for its principal object to provide a tire that can be carried in a car—a tool box or elsewhere—and be used temporarily in place of another tire in case of puncture or blow-out. The tire is made of solid flexible rubber and can be used as a spare indefinitely. Another feature of the invention is the means of placing it and attaching it on the rim. The device as shown is designed particularly for use on cars using small clincher non-split rims such as on Fords, Chevrolets, etc. It may also be used on other types of rims.

Figure 2:
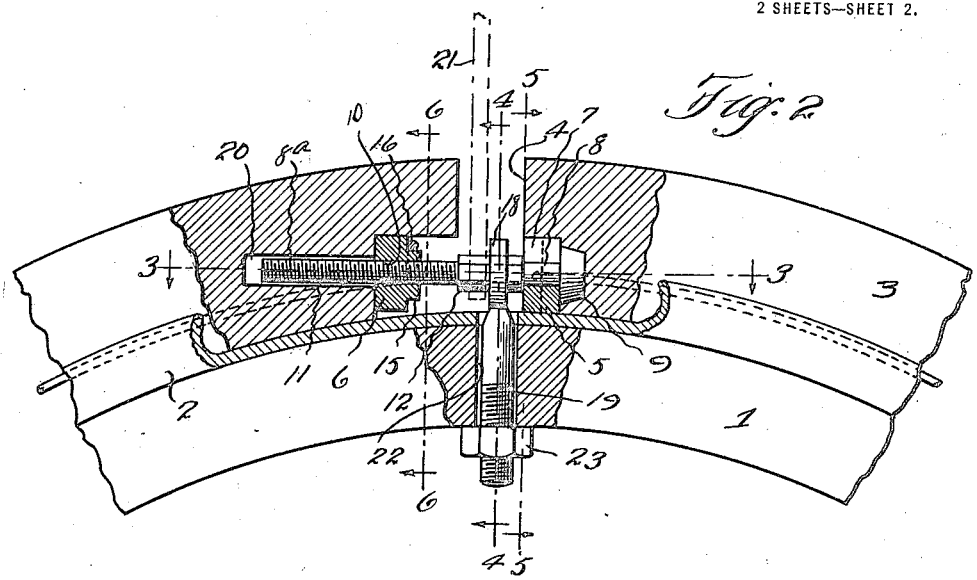
Figure 3:
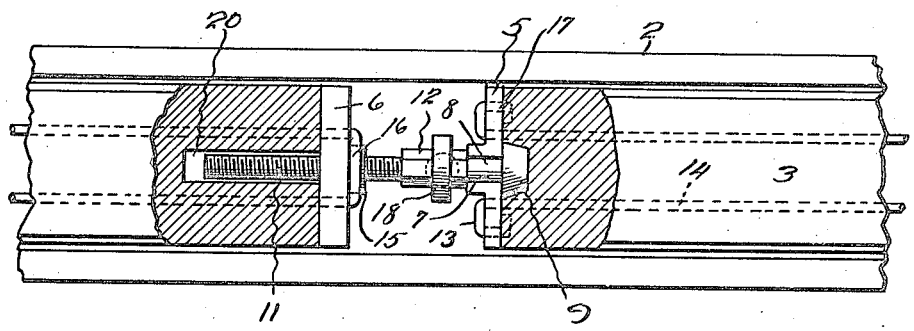
Figure 4:
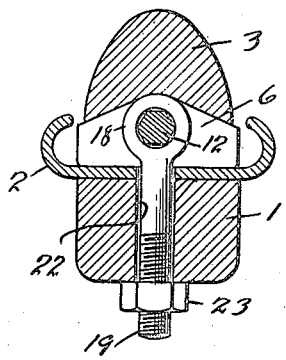

In the drawings Fig. 1 is a side elevation of a rim and felly showing my device applied thereto, Fig. 2 is a fragmentary vertical section showing the fastening means; Fig. 3 is a section on the line 3—3 of Fig. 2; and Figs. 4, 5 and 6 are sections on the lines 4—4, 5—5 and 6—6 of Fig. 2, respectively.

Referring to the drawings by reference characters, 1 indicates a felly 2 and a rim thereon. 3 indicates a solid rubber tire which is split as indicated at 4. One end has a plate 5 fastened thereto and the other has a plate 6 fastened thereto. The plate 5 is slotted as at 7 to receive the rounded neck 8 of a bolt 8ª, said bolt having a head 9 thereon which engages behind the plate 5. The plate 6 is bored and internally threaded as at 10 to receive the threaded portion 11 of the bolt. Between the rounded portion 8 and the threaded portion 10, the bolt is hexagonally shaped as shown at 12.

Plates 5 and 6 are held to the ends of the tire by a wire which has one end hooked as at 13 through two holes in one side of the plate 5 and thence extends around within the tire as indicated at 14, and passes through a hole in one side of the plate 6 and is bent over a boss 15 on the plate 6 as indicated at 16 and thence through a hole on the other side of the plate 6 and back around within the tire and through a hole on the opposite side of the plate 5 and is bent backwardly through another hole in the plate 5 as indicated at 17. This holds the plates 5 and 6 rigidly and also prevents stretching of the tire.

The hexagonal part 12 of the bolt extends through an eye 18 in a radial bolt 19 extending through the felly.

The threaded end 11 of the bolt 8ª works in a cylindrical recess 20 in the tire.

To place the tire upon the rim the bolt 8ª is rotated, by a wrench indicated in dot and dash lines in Fig. 2 at 21, said wrench being inserted between the ends of the tire and gripping the hexagonal part 12 of the bolt, until the ends of the tire are spaced far enough from each other to allow the tire to be slipped over the rim. The bolt 19 is inserted through the valve stem opening 22. The bolt 8ª is then rotated until it draws the ends of the tire close together and causes the tire to grip the rim tightly and then a nut 23 is screwed upon the bolt 19 which will securely fasten the tire to the rim and pull against the part 12 of the screw with sufficient pressure to prevent accidental turning thereof.

By the means described, the emergency rubber tire can be quickly mounted on the rim after removal of the ordinary tire. When not in use the emergency tire can be rolled up and carried in the tool box or other place on the car. When used it saves the labor of replacing and pumping up a pneumatic tire.

We claim:

1. The combination with a rim, of a split rubber tire thereon, a screw connecting the adjacent ends of the tire and having a non-circular portion to which a wrench may be applied, and an eye-bolt extending through the rim, the non-circular portion of the screw extending through the eye of the bolt, whereby when the bolt is loosened the screw may be turned and when the bolt is tightened the eye will engage said portion of the screw to prevent rotation thereof.

2. A split rubber tire having plates set in the adjacent ends thereof, and a double wire extending around through the tire, the ends of the wire being attached to one plate and the middle part of the wire being looped through the other plate, and a screw bolt connecting the plates and adjustable to draw the ends of the tire toward each other.

In testimony whereof, we do affix our signatures in presence of two witnesses.

WILLIAM T. KING.
WAYNE W. KING.

Witnesses as to William T. King:
JOHN A. BOMMHARDT,
BESSIE F. POLLAK.